Patented Jan. 31, 1950

2,495,743

UNITED STATES PATENT OFFICE 2,495,743

ALCOHOL DERIVATIVES OF SUBTILIN

James C. Lewis and Eugene F. Jansen, Berkeley, Calif., assignors to United States of America as represented by the Secretary of Agriculture No Drawing. Application February 3, 1948,
Serial No. 6,104

10 Claims. (Cl. 167—65)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to alcohol derivatives of subtilin and particularly to alcohol esters of subtilin. This invention has among its objects the provision of such compositions of matter and processes for preparing them. Other objects will be apparent from the description of the invention.

It has been found that the alcohol esters of subtilin have enhanced antibiotic properties and increased solubility as compared with subtilin itself. These derivatives have up to five times the activity of subtilin against micro-organisms. Further, they exhibit increased solubility, particularly in the presence of salt, and are thus better suited to parenteral administration than subtilin itself.

Subtilin is an antibiotic produced by a particular strain of *Bacillus subtilis* and has antibiotic activity against a number of pathogenic organisms including *Bacillus anthracis, Diplococcus pneumoniae, Neisseria gonorrheae, Mycobacterium tuberculosis,* and *Endamoeba hystolytica.*

The preparation of subtilin under submerged conditions is disclosed in the patent application of Joseph J. Stubbs, Robert E. Feeney, John A. Garibaldi, and Irvin C. Feustel, Serial No. 776,397, filed September 26, 1947. The isolation of subtilin from surface or submerged cultures is disclosed in the patent application of Keene P. Dimick, Gordon Alderton, James C. Lewis, Howard D. Lightbody, and Harry L. Fevold, Serial No. 776,396, filed September 26, 1947, Pat. No. 2,459,139, and in the patent application of Keene P. Dimick, Harry L. Fevold, Joseph J. Stubbs, John A. Garibaldi, and Howard D. Lightbody, Serial No. 777,843, filed October 3, 1947, Pat. No. 2,476,085.

The alcohol esters of subtilin are prepared by the esterification of subtilin under mild conditions such that only the carboxyl groups in the subtilin molecule are esterified and degradative reactions avoided. To this end, subtilin is reacted with an alcohol in the presence of an acid. A convenient method of procedure is to mix the subtilin with the alcohol, which may be anhydrous or may contain water, add an acid to this mixture, and allow the mixture to stand until the esterification takes place. The ester is then isolated by removing the acid anions and evaporating the water and excess alcohol. The product may also be isolated by a salting-out technique.

The process of this application is preferably applied to subtilin in purified form as is obtained by the processes of the K. P. Dimick et al. patent applications referred to above. However, it is also possible to utilize the culture media containing subtilin as such and carry out the reaction on the subtilin present in the medium. A convenient method of operating in this manner involves extracting the culture medium with an alcohol, acidifying the extract, and allowing it to stand as previously set forth.

Various alcohols may be employed, for example, methyl alcohol, ethyl alcohol, propyl alcohol, normal butyl alcohol, isobutyl alcohol, ethylene glycol, propylene glycol, butylene glycol, etc. In general, any alcohol containing from 1 to 4 carbon atoms and from 1 to 2 hydroxyl groups may be used. It is preferred to use methyl alcohol, ethyl alcohol, or ethylene glycol as the derivatives obtained from these alcohols possess the greatest antibiotic activity. Derivatives of a mixed nature may be obtained by using a mixture of alcohols such as a mixture of methyl and ethyl alcohols.

The proportion of subtilin to alcohol may vary within wide limits. Generally, the alcohol is used both as a reagent and as a solvent, and for this reason it is employed in large excess. It is generally advisable to utilize as concentrated a solution of subtilin as possible to react the greatest possible quantity of subtilin in any given time.

The solubility of subtilin in the alcohol is enhanced by the presence of water and it is thus advisable to use an aqueous alcohol to allow reaction of larger amounts of subtilin. The alcohol may contain from zero percent (anhydrous) to about 40% water. In general, however, the less water present, the faster the reaction will proceed. In considering these factors, therefore, the first step in the process will be the selection of the desired alcohol containing the desired proportion of water and dissolving therein the desired amount of subtilin up to the maximum amount soluble in the selected solvent.

Having obtained a solution of the subtilin, an acid is added in a concentration from about 0.01 N to about 0.6 N. In general, the higher concentrations of acid will cause more rapid reaction. Although hydrochloric acid is preferred, other mineral acids such as sulphuric, phosphoric, hydrobromic, etc., may be used. Regardless of what acid is employed, the concentration should be substantially within the range specified above.

The acidified solution is then allowed to stand. Usually room temperature (25° C.) is employed as it is the most convenient. However, in general, temperatures in the range from about 0° C. to about 50° C. are suitable.

The time of reaction is, of course, dependent on the other factors such as the concentration of subtilin, concentration of alcohol with respect to water, concentration of acid, and temperature. Generally, the reaction is allowed to continue until maximum biological activity is obtained. This point can be determined by conducting bio-assays at stated intervals on a pilot reaction mixture.

After the reaction has yielded a product of desired biological activity the product may be isolated in several ways. One convenient method, as for example when methyl or ethyl alcohol is used in the reaction, involves contacting the solution with an anion exchange material, for example, an organic resin anion-exchange material, to remove the acid anions (chloride ions in the case where hydrochloric acid is used as the acid). The deanionized solution is then dried to obtain the solid product. A convenient method of doing this is by freezing the entire solution with solid carbon dioxide and subjecting it to vacuum while frozen to remove the water and residual alcohol. This process is known as lyophilization. Another method of drying is to subject the solution to a vacuum while heating to a moderate temperature. The product may also be isolated by a salting-out procedure. To this end the acid solution is neutralized with a basic substance such as sodium hydroxide, ammonium hydroxide, potassium hydroxide, sodium carbonate, sodium bicarbonate, potassium carbonate, potassium bicarbonate, ammonium carbonates, etc., then subjected to evaporation. To the resulting water solution is added an inorganic salt such as sodium chloride, potassium chloride, sodium sulphate, potassium sulphate, ammonium chloride, ammonium sulphate, etc., to salt-out the product.

Where an alcohol of low volatility (ethylene glycol, for example) is used as the reactant, the following method of isolation is preferred: The acid reaction solution is neutralized with a basic substance such as sodium hydroxide, potassium hydroxide, ammonium hydroxide, sodium carbonate, sodium bicarbonate, potassium carbonate, potassium bicarbonate, carbonates of ammonia, etc. An aqueous solution of an inorganic salt such as sodium chloride, potassium chloride, sodium sulphate, potassium sulphate, ammonium chloride, ammonium sulphate, etc. is then added to salt-out the subtilin derivative. In this step it is preferred to add substantially saturated salt solution in an amount such that the glycol concentration is reduced to 20% or less. The product salted-out is removed from the solution, washed briefly with water and then with absolute alcohol and finally dried.

The following examples describe the teaching of this invention as applied to particular materials under particular conditions. It is to be understood that these examples are furnished only by way of illustration and not limitation.

In the following examples, bio-assays were carried out with the subtilin and with the novel products against *Micrococcus conglomeratus*, employing the technique described by J. C. Lewis and others in Archives of Biochemistry, vol. 14, pp. 437–450. The activity of the products is reported on a relative basis, giving subtilin an arbitrary activity of 1. Thus an activity of 3.50 means that a given weight of the product has 3.50 times the activity of the same weight of the subtilin used as the starting material.

Solubility of the products was determined in 0.85% aqueous sodium chloride solution at a pH of 7.4 and temperature 37° C. (approximate physiological condition of blood). Under these conditions subtilin had a solubility of 0.06 to 0.07%.

Example 1

One gram of subtilin was dissolved in 100 ml. of absolute methanol containing HCl in a concentration of 0.03 N. The reaction mixture was allowed to stand at about 25° C. for 44 hours. At the end of this time the solution was stirred with an organic resin anion exchange material. The de-anionized solution was then lyophilized, i. e., dried in a vacuum from the frozen state. The dry yellowish-white powder was obtained in approximately quantitative yield (methoxyl content 6.8 equivalents per 104 grams). The activity of the product was 3.5 times that of the subtilin used as the starting material.

Example 2

One gram of subtilin was dissolved in 100 ml. of 80% methanol containing HCl in a concentration of 0.3 N. The reaction mixture was allowed to stand at about 25° C. for 40 hours. At the end of this time, the product was isolated by the technique set forth in Example 1. The subtilin was recovered in a yield of 103% (methoxyl content 4.0 equivalents per 104 grams) and had a solubility of 0.13% and a relative activity of 2.2.

Example 3

One gram of subtilin was dissolved in 100 ml. of 80% ethanol containing HCl in a concentration of 0.3 N. The reaction mixture was allowed to stand at about 25° C. for 40 hours and the product recovered as set forth in Example 1. The product was obtained in a yield of 101% (ethoxyl content 2.4 equivalents per 104 grams) and had a relative activity of 1.7. The solubility of these products was 0.12%.

Example 4

One gram of subtilin was dissolved in 100 ml. of 75% ethylene glycol containing HCl in a concentration of 0.3 N. The reaction mixture was allowed to stand for 40 hours at about 25° C. Then sufficient sodium hydroxide was added to neutralize the acid and 600 ml. of 20% aqueous sodium chloride solution was added. The precipitate was removed and washed with 20% aqueous sodium chloride solution, then with 5% aqueous sodium chloride solution and finally with absolute ethanol, then dried. The product was obtained in 44% yield. It had an activity of 2.0 and a solubility of 0.13%.

The alcohol esters of subtilin of our invention possess activities against *Micrococcus conglomeratus, Staphylococcus aureus,* and *Streptococcus faecalis* in the order of 3, 2, and 4 times that of subtilin itself. In addition the novel derivatives have twice the solubility of subtilin in physiological salt solution. The products are white to yellowish-white solid materials. In the reaction of subtilin with the acidified alcohol, the carboxylic groups in the subtilin molecule are esterified. The antibiotic activity of the esters is generally proportional to the degree of esterification. Thus the esters containing from about 1 to about 8 alkoxy equivalents per 104 grams possess substantially enhanced antibiotic activity as compared with subtilin while those containing from 4 to 7 alkoxy equivalents per 104 grams possess maximum antibiotic activity.

Having thus described our invention, we claim:

1. A process for preparing an ester of subtilin which comprises forming a solution of subtilin in an alcohol containing a mineral acid in a concentration of about from 0.01 N to about 0.6 N, said alcohol having from 1 to 4 carbon atoms and containing from zero to about 40 percent water, allowing the subtilin and the alcohol to react at a temperature of about from 0° C. to 50° C. until an ester of subtilin is formed, and isolating the formed ester from the solution.

2. The process of claim 1 wherein the alcohol is methyl alcohol.

3. The process of claim 1 wherein the alcohol is ethyl alcohol.

4. The process of claim 1 wherein the alcohol is ethylene glycol.

5. A process for preparing a methyl ester of subtilin which comprises forming a solution of subtilin in substantially anhydrous methyl alcohol containing hydrogen chloride in a concentration of about 0.03 N, allowing the subtilin and the methyl alcohol to react at a temperature of about 25° C. until a methyl ester of subtilin is formed, removing the chloride ions from the resulting solution by contacting it with an anion exchange material, and drying the de-anionized solution to obtain the formed ester in solid form.

6. A process for preparing an ethylene glycol ester of subtilin which comprises forming a solution of subtilin in about 75 percent aqueous ethylene glycol containing hydrogen chloride in a concentration of about 0.3 N, allowing the subtilin and the ethylene glycol to react at a temperature of about 25° C. until an ethylene glycol ester of subtilin is formed, and isolating the formed ester by salting it out from the solution.

7. An ester of subtilin and an alcohol containing 1 to 4 carbon atoms.

8. An ester of subtilin and methyl alcohol.

9. An ester of subtilin and ethyl alcohol.

10. An ester of subtilin and ethylene glycol.

JAMES C. LEWIS.
EUGENE F. JANSEN.

REFERENCES CITED

The following references are of record in the file of this patent:

Jansen et al.: Arch. Biochem., vol. 4, pages 297–309 (1944). (Copy in Scientific Library.)

Dimick et al.: Arch. Biochem., Oct. 1947, pages 1–11. (Copy in Scientific Library.)

Salle: "The Nature, Properties and Toxicity of Subtilin" (paper presented at the Conference on Antibiotic Research held at Washington, D. C., on Jan. 31 and Feb. 1, 1947, under the auspices of the Antibiotics Study Section of the National Institute of Health). (Copy in Div. 59.)